Figure 1:
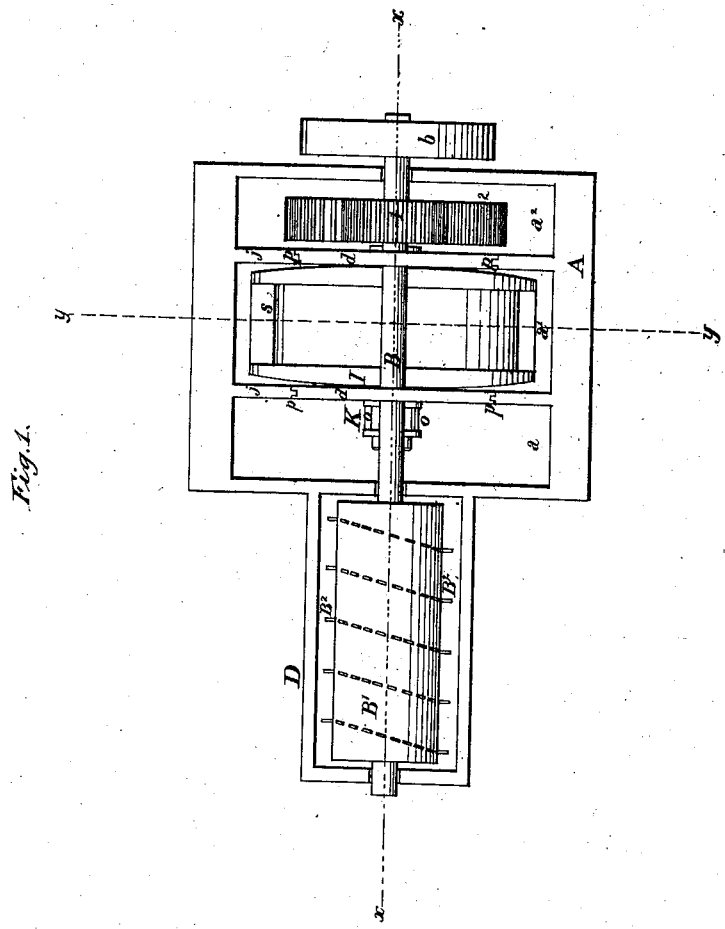

Sheet 1, 2 Sheets.

M. Laflin.
Dry Amalgamator.
Nº 44,320. Patented Sept. 20, 1864.

Witnesses:
C. L. Topliff
Henry Morris

Inventor:
M. Laflin
per Munn
atty

M. Laflin.
Dry Amalgamator.
N° 44,320. Patented Sept. 20, 1864.
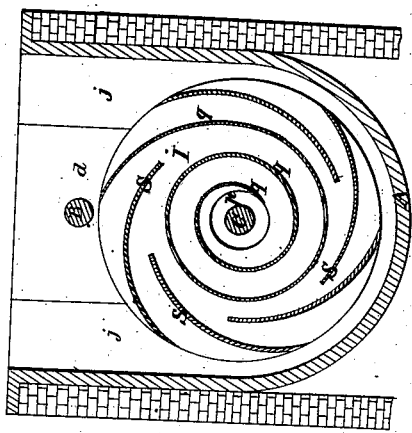
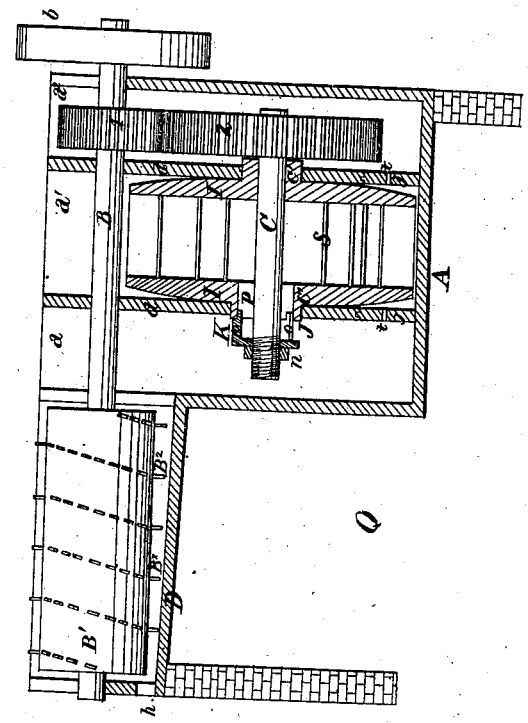
Witnesses:
C. L. Topliff
Henry Morris
Inventor:
M. Laflin
per Munn & Co.
attys

UNITED STATES PATENT OFFICE.

MATTHEW LAFLIN, OF CHICAGO, ILLINOIS.

IMPROVED MODE OF SEPARATING GOLD AND SILVER FROM ORES.

Specification forming part of Letters Patent No. 44,320, dated September 20, 1864.

*To all whom it may concern:*

Be it known that I, MATTHEW LAFLIN, of Chicago, in the county of Cook and State of Illinois, have invented a new and useful Improvement in Gold and Silver Separators; and I do hereby declare that the following is a full, clear, and exact description thereof, which will enable those skilled in the art to make and use the same, reference being had to the accompanying drawings, forming part of this specification, in which—

Figure 1 is a plan of a machine for separating gold or silver from pulverized quartz or other ores or substances. Fig 2 is an elevation of a vertical section on the line $x$ of Fig. 1. Fig. 3 is a transverse vertical section on the line $y$ of Fig. 1.

Similar letters of reference indicate corresponding parts.

My invention relates to the separation of gold and silver from other metals and substances with which they may be respectively mixed; and it consists in compelling quartz or other ore, or any other substances or earths which contain gold or silver, to be immersed or to pass in a dry and pulverized state through a bath of molten lead, or its equivalents, in which sulphurets and other refuse matter will be decomposed and the metals sought be thereby separated, so as to come in contact with the lead, or its equivalents, by which they will be absorbed.

The mechanical devices represented in the accompanying drawings illustrate the principle of my invention and show one way of carrying it out.

An iron or other suitable vessel, A, of suitable strength, having a trough, D, extending from one of its sides, is supported upon the walls of a furnace, Q, so that a fire may be built beneath it. The main vessel is subdivided into three divisions, $a$ $a'$ $a^2$, by vertical partitions $jj$, whose central parts, $d$, are made with a tongue and groove, so that they can be drawn upward and disconnected from the sides and bottom of the partitions. A driving-shaft, B, carrying a driving-pulley, or other equivalent device, extends centrally across the vessel A and throughout the length of the trough D, being journaled in their sides, as seen in the figures. This shaft passes through the sliding center pieces, $d$, of the partition, and is also journaled therein. It carries at one end a pinion, 1, which revolves in division $a^2$, and at the other end a conveyer, B', which consists of a metallic cylinder armed with metallic blades $B^2$, arranged spirally around it throughout its length. A discharge-opening, $h$, is made in the outer end of the trough, on a level with its bottom, and its inner end is cut away below the level of the shaft B, so as to permit free communication between the vessel A and its trough. The bottom of the trough D is inclined, as shown, so that there shall be descent enough to allow any substance to be carried by gravity into the vessel A, provided it is not being impelled in the other direction by the conveyer. As the conveyer lies in a horizontal plane, the bottom of the trough in which it revolves recedes from it by a distance which gradually increases from the discharge-opening $h$ to the inner end of the trough, so that the spiral blades in their revolution will approach very near to the bottom of the trough only at its outer end. A scroll-wheel, I, whose hubs C' are journaled in the center pieces, $d$, revolves in the lower part of the central division, $a'$. It is rotated by means of a shaft, C, which passes axially through the hubs C' and extends into the divisions $a$ and $a^2$ at each side, carrying in the latter division a gear-wheel, 2, which meshes with the gear 1 on the shaft B. The hub at the right-hand end of the shaft C is securely keyed to it, while the opening in the other hub for the passage of the shaft is of larger diameter than the shaft, so as to allow an annular space, $p$, between the shaft and the inside of the hub. This end of the shaft is supported in an open collar, K, which is connected to the outer end of the hub by means of ribs $o$, (three or more,) and is held securely against it by means of a tightening-nut, $n$, secured upon the shaft. (See Fig. 2.)

The scroll-wheel I is of iron, made by inclosing a central scroll, $q$, and sectional scrolls S between two disks, between which they are securely held. These scrolls may be let into grooves cut in the face of one of the disks and firmly secured therein, and the other disk may be either grooved to receive the opposite edges of the scrolls or it may be plain, and their lines of contact with the disk may be made sufficiently tight by means of the screw $n$. The outer sides of the disks must be convex, so that earthy or other matter shall not collect between their sides and the partitions and clog the scroll wheel. (See Figs. 1 and 2.) An opening, t, is made in the partitions j, below the shaft C, between the divisions, as seen in Fig. 2, to allow communication between them.

The operation is as follows: The center pieces, d, having been withdrawn with the shafts B and C and the scroll-wheel, the vessel A is supplied with lead or its equivalent, which is melted by means of a fire in the furnace Q beneath. This fire is to be actively maintained during the operation of the apparatus; or the lead or other menstruum may be put in the vessel A without removing any of the parts and melted by means of the fire beneath, as aforesaid. The center pieces, d, are then to be replaced, if they have been withdrawn, with their shafts and scroll-wheel and conveyer. The molten lead or other material employed should be in sufficient supply to reach to a little above the height of the bottom of the trough, and not so as to cover the scroll-wheel. The scroll-wheel being now rotated, the pulverized quartz or metalliferous earth or other substance is poured into the division $a'$, or fed thereto by means of a hopper, when the scrolls $s$ and $q$ will in their revolution carry it beneath the surface of the lead and retain it in their folds or leaves until it has passed entirely through them and been delivered through the central discharge-opening, $p$, into division $a$, when its levity will carry it up through the overlying mass of lead and enable it to be presented at the end of the trough D, into which it will be drawn by the operation of the conveyer. The cylinder is rotated so that the spiral leaves will impel whatever bodies or substances they strike against toward the discharge $h$ of the trough; and, as the quartz, earth, or other substance under treatment is of less specific gravity than the lead, they will float thereon and continually present themselves to the action of the conveyer, while the lead will continually escape down the inclined bottom of the trough into the vessel $a$. The spaces between the leaves of the scrolls $q$ and $s$ will be always filled with the molten lead or other menstruum employed, and when the quartz or other ore or earth is immersed in and brought in contact with the heated mass the sulphurets which are present become decomposed by the heat, thereby liberating the gold, which immediately adheres to or is absorbed by the lead.

Ores or earths containing silver are to be treated in the same manner.

The molten lead will stand at the same height in the three divisions $a$ $a'$ $a^2$, since they communicate with each other, and the gear-wheel 2 will be immersed therein; but if the joints between the divisions $a'$ and $a^2$ and the journal of the shaft C and the hub of the scroll-wheel are packed sufficiently tight to prevent the passage of the metal through them, the divisions may be wholly separated and the partition $j$ between them become the side of vessel A at that end.

I do not restrict myself to the use of lead as an amalgamator and means of decomposing the combustible ores, but propose to use any alloy which has lead for one of its component parts.

The refuse which passes off from the trough at $h$ will require to be sifted in order to save any lead or other metal which may have passed through the conveyer, although it is intended that the conveyer shall act only upon the floating refuse which shall be found upon the top of the molten mass. My practice is to pass the refuse under a heavy roller, which will crush and pulverize the earthy matter to a still finer condition, but will roll out the lead or other metal into scales, so that when the whole is passed through the sieve the scales of metal will be retained in its meshes, when they may be returned to the vessel A.

When sufficient quartz or metal-bearing earth has been passed through the scroll to charge the menstruum with the gold or silver sought, the mass is to be subjected to cupellation in the ordinary way in order to separate the metals.

Any other suitable means of conveying the refuse from the vessel after it has passed through the molten mass may be used.

If the lead or other material used for separating the gold or silver becomes too small in quantity for successful operation by means of its escape through the trough, or by being wasted through oxidization, fresh supplies of lead or other material used are to be added to the mass.

The scrolls of the immersing-wheel may be more or less in number than I have shown, and any other form of immersing and mixing agency may be used which shall be found effectual.

Any fumes that arise from the vessel A while the operation is going on may be carried off by means of a hood or other cover.

I do not claim the machine nor its equivalent, herein described, as the same is the invention of H. H. Scoville and P. W. Gates, of Chicago, Illinois.

I claim as new and desire to secure by Letters Patent—

Separating gold or silver from quartz or other substances by means of molten lead or its equivalent under a mode of operation substantially as above set forth.

MATTHEW LAFLIN.

Witnesses:
M. M. LIVINGSTON,
C. L. TOPLIFF.